T. D. CULTER.
Rod Coupling.
No. 195,988.   Patented Oct. 9, 1877.
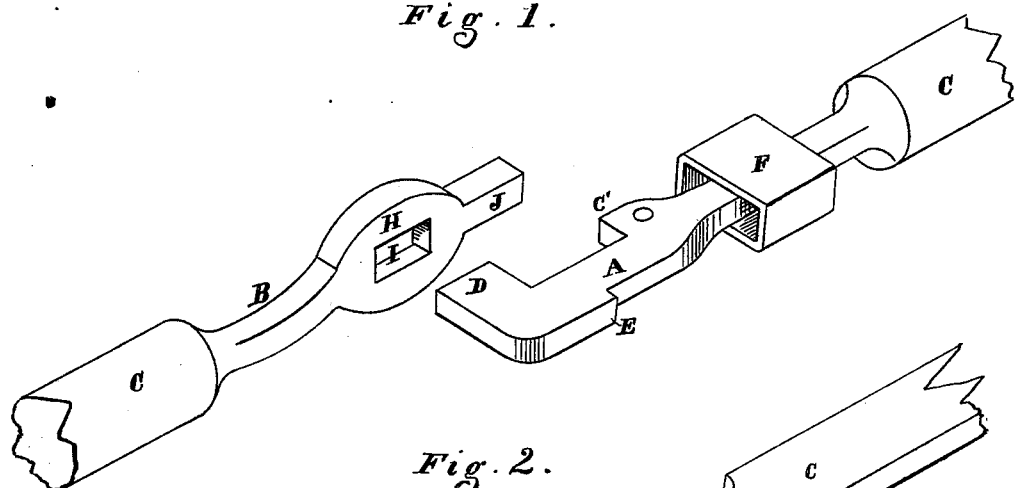
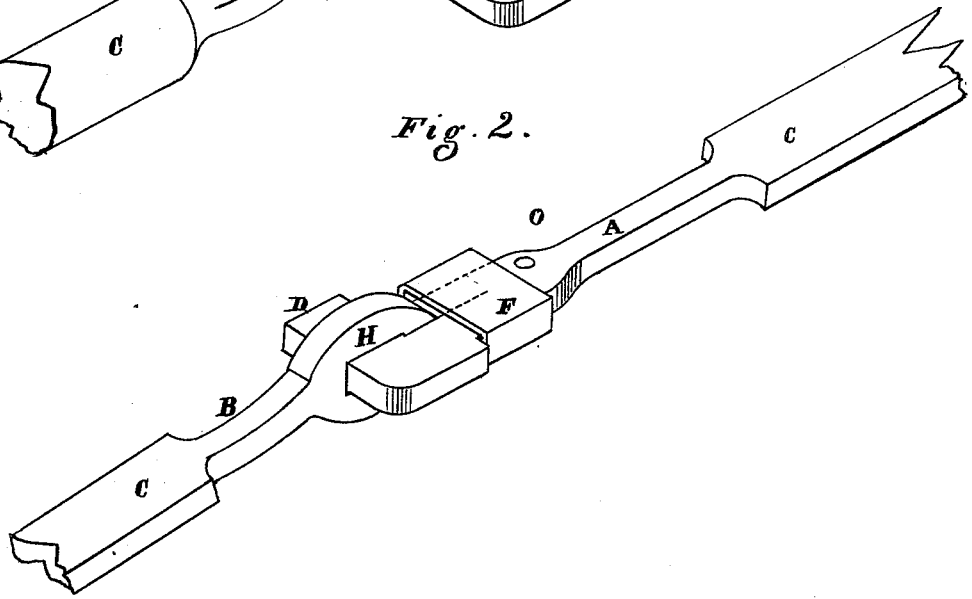
Witnesses
Geo. H. Strong
Jno. L. Boone
Inventor
Theodore D. Culter
Dewey & Co.
Attys.

UNITED STATES PATENT OFFICE.

THEODORE D. CULTER, OF WESTMINSTER, CALIFORNIA.

IMPROVEMENT IN ROD-COUPLINGS.

Specification forming part of Letters Patent No. 195,988, dated October 9, 1877; application filed June 14, 1877.

*To all whom it may concern:*

Be it known that I, THEODORE D. CULTER, of Westminster, county of Los Angeles, and State of California, have invented an Improved Rod-Coupling; and I do hereby declare the following to be a full, clear, and exact description thereof, reference being had to the accompanying drawings.

My invention relates to an improved coupling for connecting such rods as are used in boring Artesian wells, and can also be used for connecting other tubes and rods where great strength is required and rapidity in connecting and disconnecting the pipes or tubes is desirable.

My invention is fully represented in the accompanying drawings, in which—

Figures 1 and 2 are views of my device.

My improved coupling consists of two interlocking parts, A B. Each rod or tube C to be connected together I provide with an extension similar to A at one end, and an extension similar to B at its opposite end, so that any number of rods can be connected together in the usual manner of providing rods or tubes with male and female couplings.

The extension A is short bar of metal, which extends from one end of each rod or tube C to be connected together. This bar has a shoulder or enlargement, $c'$, formed on it on one side, and its extremity is bent at right angles on the same side, so as to form a hook, D, thus providing a recess between the hook and shoulder, as represented. On the opposite side of the bar is a shallow shoulder, E, and a band, F, is arranged to slide up and down along the upper part of the bar next to the end of the rod, and be stopped by this shallow shoulder E.

The extension B, which extends from the opposite end of the same rod C, or from the end of any other rod which it is desired to connect with the rod C, has an enlargement, H, in the center of which is a hole, I. This hole is just large enough to allow the hook D to enter it. The extremity J of this bar extends sufficiently beyond the hole I to fit in the recess between the shoulder $c'$ and hook D, and is of equal thickness with the bar A, so that the band F can be slipped down over the end of the extension B until it rests upon the shoulder E, thus firmly securing the extension B upon the hook of the extension A, and coupling the two rods or tubes together.

There is no weld except in the band F, which secures the parts in position when coupled. This band is so made as to slide easily from its secured position upward, thereby allowing the lower half or part B to be removed from the upper half or part A. The half of the part B is so constructed, having a slight bend, as represented, as to bring the bearing on a direct line with the bar A.

It will be seen that the elbow or hook is nicely fitted to the hole in the bar B, and at the same time makes a neat fit in the recess when fitted.

It is also designed that the shoulder $c$ and hook or elbow shall equally share the weight of whatever may be above them when coupled together, thereby greatly diminishing the wear when pumping or drilling.

When necessary, the band is secured in position by drawing a key through a small hole, O, in the part A; or a spring could be placed in the side of the bar for this purpose.

Having thus described my invention, what I claim, and desire to secure by Letters Patent, is—

A rod or tube coupling consisting of the bar or extension A, with its shoulder $c'$, hook or elbow D, and notch E, in combination with the extension or bar B, with its hole I and extremity J, the two parts being fitted together as described, and held in place by the band F, substantially as specified.

In witness whereof I have hereunto set my hand and seal.

THEODORE D. CULTER. [L. S.]

Witnesses:
    S. H. BUTTERFIELD,
    J. F. MARQUIS.